Figure 1:
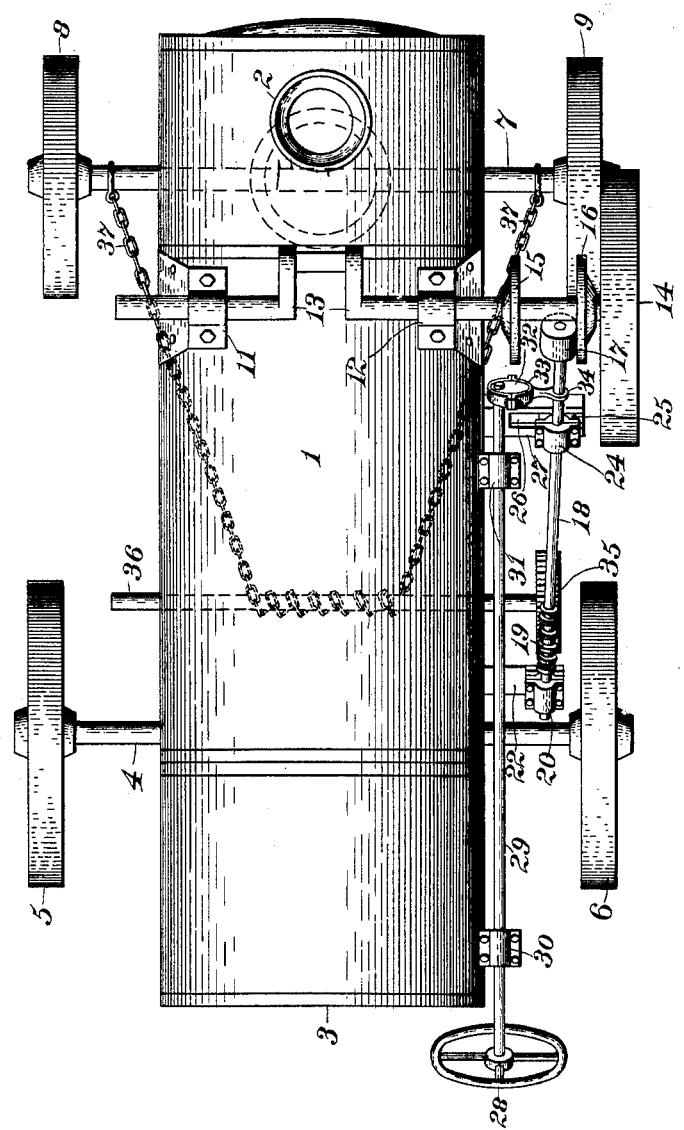

(No Model.) 2 Sheets—Sheet 1.
W. B. SCHREIBER.
STEERING DEVICE FOR MOTOR VEHICLES.

No. 595,254. Patented Dec. 7, 1897.

Witnesses
James S. Smith
Sam'l H. Jacobson

Inventor
Wilmert B. Schreiber,
By Harvey Spalding and Sons.
Attorneys (No Model.) 2 Sheets—Sheet 2.
W. B. SCHREIBER.
STEERING DEVICE FOR MOTOR VEHICLES.
No. 595,254. Patented Dec. 7, 1897.
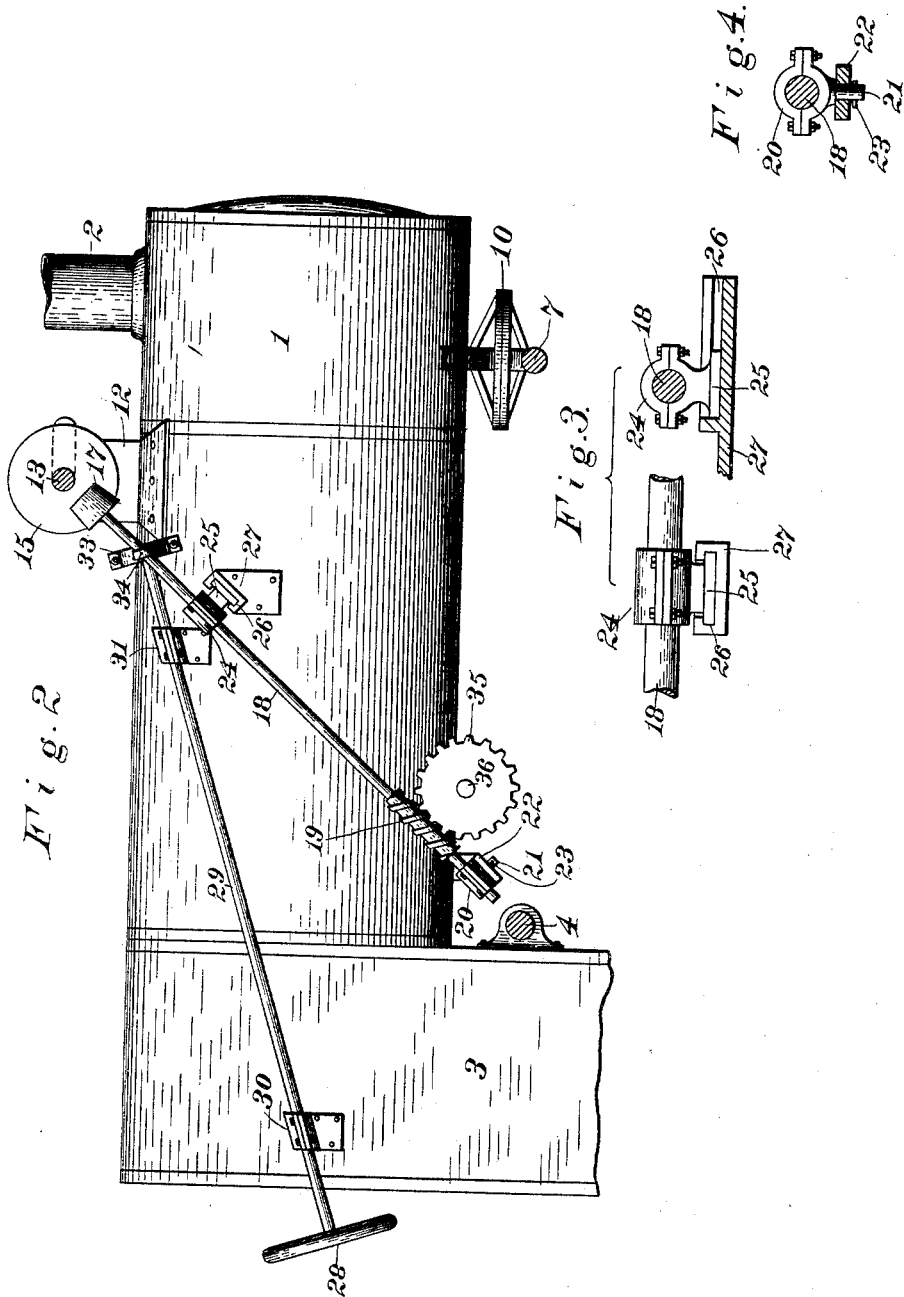

UNITED STATES PATENT OFFICE.

WILMERT B. SCHREIBER, OF FLOYD'S KNOBS, INDIANA, ASSIGNOR OF ONE-HALF TO AUGUST SPERZEL AND ALBERT F. SPERZEL, OF GALENA, INDIANA.

STEERING DEVICE FOR MOTOR-VEHICLES.

SPECIFICATION forming part of Letters Patent No. 595,254, dated December 7, 1897.

Application filed July 6, 1897. Serial No. 643,622. (No model.)

*To all whom it may concern:*

Be it known that I, WILMERT B. SCHREIBER, a citizen of the United States, residing at Floyd's Knobs, in the county of Floyd and State of Indiana, have invented certain new and useful Improvements in Steering Devices for Motor-Vehicles, of which the following is a specification.

My invention relates to steering devices for motor-vehicles, and has for its object the production of improved means for applying at will the power of the motor to turn one or the other or both axles from their normal positions.

My newly-invented improvements consist in the combination of friction-disks on the driving-shaft of the motor and a friction-cone secured upon a shaft supported in sliding and pivotal bearings and having a worm arranged to engage a worm-wheel that operates a winding-shaft from which chains lead, usually to the front axle. A hand-wheel is provided near the rear end of the vehicle, as convenience may direct, with suitable shafting and connections adapted to bring the friction-cone against either friction-disk, as desired. Each constituent element of my invention is described in detail and its individual office, together with the mode of operation of the whole, fully explained hereinafter.

Referring to the accompanying drawings, wherein like numerals designate like parts throughout, Figure 1 represents a top view with part of the steering mechanism in perspective; Fig. 2, a side elevation, the fly-wheel of motor and supporting-wheels of vehicle having been removed; Fig. 3, a detached detail view of the sliding bearing, and Fig. 4 a detail view of the pivotal bearing alone.

Considering Fig. 1, numeral 1 marks a boiler having stack 2, fire-box 3, a rear axle 4, rear wheels 5 6, a front or forward axle 7, front wheels 8 9, and a fifth-wheel mechanism 10, possessed by the front axle, enabling it to be turned in a horizontal plane, according to the common manner of constructing such parts of vehicles.

Upon boiler 1 in bearings 11 12 is journaled the motor-shaft or crank-shaft 13, having a fly-wheel 14 and the two friction-disks 15 16.

Considering also Figs. 2, 3, and 4, there will be seen between the disks a friction-cone 17, which is secured to an end of a shaft 18. Near the remaining end of shaft 18 is fixed the worm 19, and the extreme end of the shaft is supported in a pivotal bearing 20. (See Fig. 4.) It will be noted that the bearing or journal-box 20 possesses a projecting pin 21, passing through an orifice in bracket 22, upon which the bearing rests. The bracket is usually screwed to the boiler. A spring-cotter 23 is let through pin 21 below the bracket, or any effective device may be introduced to prevent bearing 20 from leaving its socket. Shaft 18 passes through a second journal-box 24, (see Figs. 1, 2, and 3,) that is also of special construction. A flanged pillow-block 25 is formed to fit movably and to be reciprocated within a T-groove 26 of a bracket 27, the bracket being screwed or riveted to the boiler, as shown.

In Figs. 1 and 2 are representations of hand-wheel 28, secured to the end of shaft 29, the latter being held in inclined bearings 30 31. At the upper end of shaft 29 is attached the eccentric 32, having strap 33, and a rod 34, pivotally joined to shaft 18.

Both shafts 18 29 are borne upon an incline, their relative positions being shown in Fig. 2.

The engagement between worm 19 and worm-wheel 35 is best shown in Fig. 2 and the winding-shaft or worm-wheel shaft 36 in Fig. 1. As the parts of my invention are ordinarily assembled shaft 36 is revoluble in suitable bearings beneath the boiler, and a chain 37 is wound about it, the ends of the chain being made fast near the ends of axle 7. It is within the scope of my invention to substitute a wire rope for chain 37 and to provide shaft 36 with a drum adapted for the purpose.

Fig. 1 best aids the explanation of the operation of my invention. Eccentric 32 and parts immediately related are proportioned to enable a person operating the hand-wheel to bring cone 17 against either friction-disk and to exert more or less pressure thereon. It will be noted that shaft 18, as moved by the eccentric, acts as a pivoted arm, with bearing 20 as a center. Therefore bearing 20 is supported pivotally, as described. Farther along the shaft must necessarily be furnished with a sliding bearing 24, through which a slight longitudinal movement of the shaft takes place during its lateral journey. During the movement of shaft 18 by the eccentric-rod worm 19 is at no time released from its engagement with worm-wheel 35. The pitch both of worm and wheel is chosen with the displacement of the worm in view. If crank-shaft 13 be revolving and the vehicle in motion, the winding-shaft 36 will be correspondingly actuated and one or the other of front wheels 8 9 drawn upon and retarded, changing the course of the machine.

It is believed to be within the scope of my invention to cover the friction disks and cone with any material that will improve their effect.

I am aware that steering devices for motor-vehicles provided with winding-drums, chains or ropes, and mechanism for connecting the steering elements at will with the motor have been used, and I do not claim that feature, mechanism, or those elements, broadly.

What I claim, and desire to protect by Letters Patent of the United States, is—

In a steering device for motor-vehicles, the combination of a winding-shaft, a pivoted axle, a chain encircling said shaft and having its ends connected to said axle, a worm-wheel attached to said shaft, a shaft having a worm constructed to engage said worm-wheel, a journal-box 20 having a pin 21, a bracket 22 bored to receive said pin and adapted to support said journal-box pivotally near said worm-wheel, a flanged pillow-block 25, a bracket 27 having groove 26 in which said pillow-block may be reciprocated, said pivoted box 20 and sliding block 25 affording bearings for said worm-shaft, a driving or crank shaft, friction-disks fixed upon said crank-shaft, a friction-cone secured to said worm-shaft and situated between said disks, a hand-wheel, a hand-wheel shaft, and an eccentric upon said hand-wheel shaft having a rod pivotally connected with the worm-shaft, substantially as described.

In witness whereof I hereunto set my hand in the presence of two witnesses.

WILMERT B. SCHREIBER.

Witnesses:
W. F. MORRILL,
HERMAN KORTE.